W. R. HOWLES.
PENDULUM WEIGHING SCALE.
APPLICATION FILED OCT. 22, 1915.

1,251,529.

Patented Jan. 1, 1918.
2 SHEETS—SHEET 1.

INVENTOR:
W. R. HOWLES
BY: H van Oldenzeel
ATTORNEY.

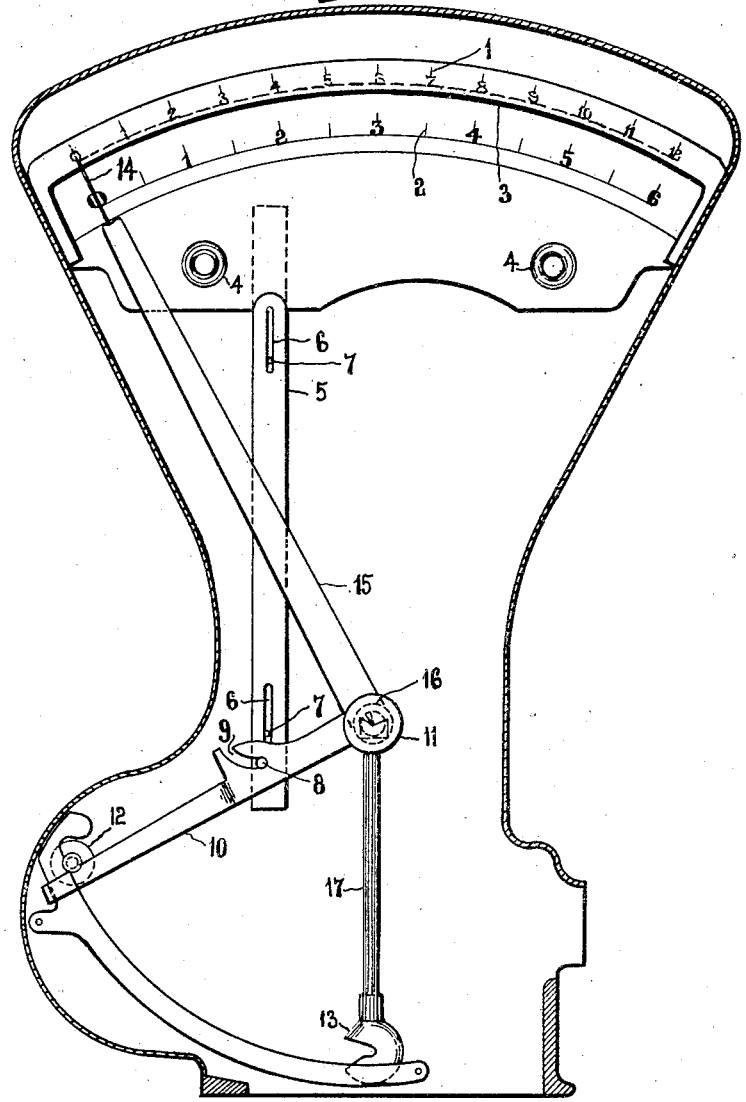

UNITED STATES PATENT OFFICE.

WALTER RICHARD HOWLES, OF SMETHWICK, ENGLAND, ASSIGNOR TO W. & T. AVERY, LIMITED, OF SMETHWICK, ENGLAND.

PENDULUM WEIGHING-SCALE.

1,251,529.   Specification of Letters Patent.   Patented Jan. 1, 1918.

Application filed October 22, 1915. Serial No. 57,347.

*To all whom it may concern:*

Be it known that I, WALTER RICHARD HOWLES, a subject of the King of Great Britain, residing at Soho Foundry, Smethwick, in the county of Stafford, England, have invented a new and useful Improvement in Pendulum Weighing-Scales; and I do hereby declare the following to be a full, clear, and exact description of the same.

This invention has reference to improvements in pendulum weighing scales or pendulum weighing and price computing scales, and relates more particularly to the type of pendulum weighing scale or weighing and price computing scale described in the specification of the United States Patent No. 998220, wherein means are provided for mechanically changing the weight of the pendulum, simultaneously effecting an alteration in the price indications upon the index finger or arm and changing a plate whereon is a notification as to which series of price computing numerals are to be read in conjunction with the weight indications. Scales of the said type have two rows of weight indications or graduations according with the two different effective weights of the pendulum, both of the rows of said weight indications being always visible, and preferably of different color for the purpose of readily distinguishing them.

The object of the present invention is to provide means whereby only one of the rows of the weight indications is visible at a time, the visible row according with the weight of the pendulum, so that when the effective weight of the pendulum is changed a corresponding change is simultaneously made in the weight indication, that is, the other row of weight numerals is made visible, while the row previously visible is obscured to avoid any possible error in the reading of the weight indication.

For carrying out the present invention we preferably employ in combination therewith similar mechanism to that already described in the specification of the aforesaid patent for effecting the alteration in the weight of the pendulum, that is, a knob mounted to revolve in the casing of the scale, the rotation of the said knob radially moving or rocking an arm which is adapted to coöperate with the additional weight for the pendulum.

The invention comprises the combination in a pendulum weighing scale employing two or more rows or series of weight indications or graduations of means whereby one of the rows or series only is visible at a time, said means being operable simultaneously with the means for changing the effective weight of the pendulum of the scale.

A means for carrying this invention into practice is illustrated by the accompanying drawings, in which:—

Fig. 3 is a similar view of the scale to that shown by Fig. 1, but illustrating the shutter in its raised position.

Figure 1:
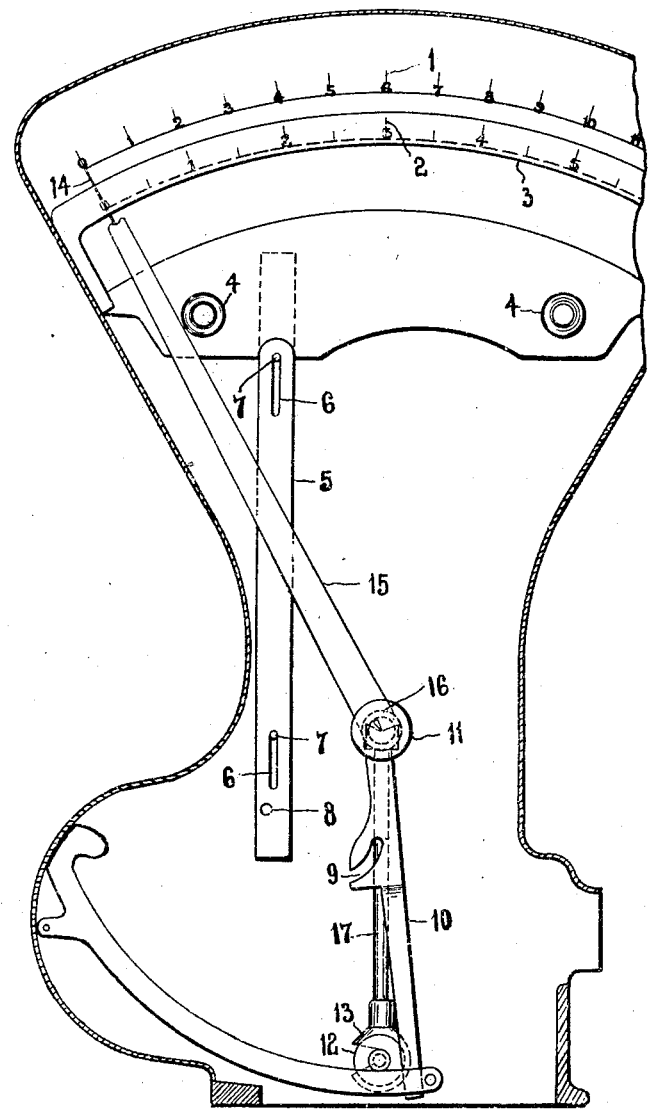
Figure 1 is a part sectional front elevation of a weighing scale wherein the shutter is shown in its lowered position.
Figure 2:
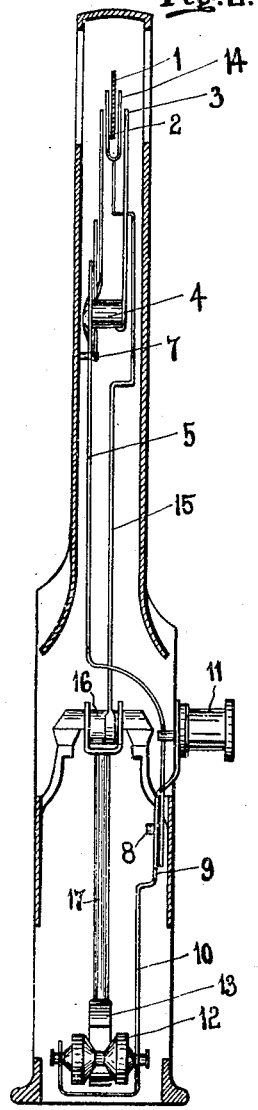
Fig. 2 is a part sectional side elevation of the scale and mechanism in the position seen in Fig. 1.

The drawings only illustrate such parts of the scale mechanism as are necessary to an understanding of the present invention.

The scale is provided with a duplex row or series of weight indications or graduations, the upper row or series 1 being graduated from zero to 12 lbs., and the lower row or series 2 being graduated from zero to 6 lbs. Disposed on both sides of the weight indications or graduations is a shutter 3 formed as a quadrant or segment arranged to cover one or other of the rows or series 1 or 2. The two quadrants or segments forming the shutter 3 are plates formed from sheet metal and are connected by means of two rivets 4, 4. Secured to the shutter is a vertical arm 5 provided with slots 6 by means of which the arm is mounted on pins 7, 7, so as to permit of a vertical guided motion of the arm 5 and shutter 3. Fixed on the arm 5 is a projecting pin 8 adapted to be engaged by the curved slot 9 in the rocking arm 10 mounted on the rotatable knob 11, said arm 10 being adapted to control the additional weight 12 of the pendulum 13 as described in the aforesaid Patent No. 998,220. The index pointer 14 disposed on both sides of the weight indications 1 and 2 is mounted on a cranked arm 15 the said arm being mounted on the fulcrum knife-edge 16 of the pendulous weighing lever 17.

The operation of the mechanism is as follows:—

When the scale is weighing within the range of its full capacity, in this instance 12 lbs., the additional weight 12 is upon the pendulum 13, and the upper row or series of weight indications or graduations 1 is exposed, the shutter 3 being in its lowered position and covering the row or series 2. When however it is desired to weigh within the lower range of capacity, i. e. 6 lbs., the knob 11 is turned to rock the arm 10 radially to the position seen in Fig. 3, thereby removing the additional weight 12 from the pendulum 13 in the manner described in the aforesaid patent. Simultaneously the curved slot 9 in the arm 10 engages the projecting pin 8 on the vertical arm 5 thereby raising the shutter so as to expose the row or series of weight graduations 2 and cover the row or series 1. Alternatively when the additional weight 12 is lowered onto the pendulum 13 to increase the weighing capacity of the scale, the rocking arm 10 is disengaged from the pin 8 and thus the vertical arm 5 and the shutter 3 are lowered to expose the upper series of graduations 1. The weight is indicated upon the rows or series of indications 1 or 2, by means of the index pointer 14.

By means of this invention only one of the rows of weight indications is visible at a time, and thus any error in the reading of the indication of the weight is avoided.

What I claim is:—

1. In a pendulum weighing scale, the combination of a member provided with a plurality of series of weight indications, a pendulum, an indicator controlled thereby for coöperation with any of said series, means for changing the effective weight of the pendulum, manual means operatively connected to said weight changing means for alternatively exposing and obscuring part of the said series so as to coördinate the exposed series with the effective weight of the pendulum.

2. In a pendulum weighing scale, the combination of a member provided with weight indications arranged in rows or series, a pendulum, an indicator controlled thereby for coöperation with any of said series, means for changing the effective weight of the pendulum, manual means operatively connected to said weight changing means for alternatively exposing or obscuring one of said rows or series, the exposed indications corresponding with the weight or weighing capacity of the pendulum.

3. In a pendulum weighing scale, the combination of a member provided with weight indications arranged in rows or series, a pendulum, an indicator controlled thereby for coöperation with any of said series, a shutter adapted to alternatively expose or obscure part of said rows or series, means operatively connected with said shutter for changing the effective weight of the pendulum of the scale whereby the exposed indications correspond with the weight or weighing capacity of the pendulum.

4. In an automatic pendulum weighing scale, the combination with a casing, of a shutter adapted to alternatively expose and cover weight indications of the scale, a member provided with a vertically slidable arm mounted on the casing of the scale and secured to the said shutter, a projecting pin secured to said arm, a rocking arm adapted to engage said pin, means, external of the casing of the scale, to operate said arm, and means for changing the effective weight of the pendulum operatively connected to said shutter.

5. A pendulum weighing scale having in combination, with a casing, a member provided with a duplex series of weight indications, an index pointer coöperating with said indications, a variable pendulum adapted to automatically counterbalance the load upon the scale and to control said pointer, a rocking arm adapted to be operated by means external to the casing of the scale, a projecting pin, a slotted arm to which said pin is secured, and a shutter secured to the upper end of said slotted arm and adapted to expose or obscure one or the other of said duplex series of weight indications in coördination with the variation in the effective weight of the pendulum.

In testimony whereof, I have signed my name to this specification in the presence of two subscribing witnesses.

WALTER RICHARD HOWLES.

Witnesses:
GEORGE E. FOLKES,
NORMAN S. BARLOW.

Copies of this patent may be obtained for five cents each, by addressing the "Commissioner of Patents, Washington, D. C."